United States Patent [19]

Lee

[11] Patent Number: 5,608,895
[45] Date of Patent: Mar. 4, 1997

[54] METHOD FOR PROVIDING MOUSE FUNCTIONALITY USING EITHER AN INTERNAL OR EXTERNAL MOUSE INPUT DEVICE

[75] Inventor: Kwanho Lee, Seoul, Rep. of Korea

[73] Assignee: Samsung Electronics Co., Ltd., Rep. of Korea

[21] Appl. No.: 346,843

[22] Filed: Nov. 30, 1994

Related U.S. Application Data

[63] Continuation of Ser. No. 991,096, Dec. 15, 1992, abandoned.

[30] Foreign Application Priority Data

Jun. 13, 1992 [KR] Rep. of Korea ............. 92-10300

[51] Int. Cl.$^6$ .............................................. G06F 9/455
[52] U.S. Cl. ......................... 395/500; 345/157; 345/163
[58] Field of Search ......................... 395/500; 345/157, 345/168

[56] References Cited

U.S. PATENT DOCUMENTS

| | | | |
|---|---|---|---|
| 4,760,386 | 7/1988 | Heath et al. | 345/180 |
| 5,049,863 | 9/1991 | Oka | 345/163 |
| 5,058,046 | 10/1991 | Lapeyre | 364/709.16 |
| 5,124,689 | 6/1992 | Franz et al. | 345/160 |
| 5,189,403 | 2/1993 | Franz et al. | 345/172 |
| 5,198,802 | 3/1993 | Bertram et al. | 345/146 |
| 5,305,449 | 4/1994 | Ulenas | 395/500 |
| 5,479,192 | 12/1995 | Carroll et al. | 345/168 |

FOREIGN PATENT DOCUMENTS

| | | |
|---|---|---|
| 0433206A2 | of 0000 | European Pat. Off. . |
| 4000625 | 1/1992 | Japan . |
| 4-625 | 1/1992 | Japan . |

OTHER PUBLICATIONS

Research Disclosure article; Compatible Mouse and Mouseless User Interface; Apr. 1986; No. 264 article 26411; p. 176.

Bimodal Mouse IBM T.D.B.; vol. 29, No. 1; Jun. 1986; pp. 421–422.

Method for Concurrent Support of Keyboard and Mouse IBM T.D.B.; vol. 30, No. 11; Apr. 1988; p. 110.

*Primary Examiner*—William M. Treat
*Assistant Examiner*—Kenneth R. Coulter
*Attorney, Agent, or Firm*—Christie, Parker & Hale, LLP

[57] ABSTRACT

A method for forming a keyboard with a mouse function capable of replacing the mouse function by moving a pointer on a screen to an X axis (horizontal axis) and a Y axis (vertical axis) freely, by switching an operation mode of the keyboard and using a cursor key of the keyboard instead of a mouse. This method includes the following steps: a step for detecting whether a mouse driver is enabled when an external mouse is not connected to the computer system after determining whether the external mouse is connected to the computer system if an emulation for a mouse command is finished; a step for carrying out a corresponding process to each command of a mouse, and detecting whether the mouse hot key is enabled in the above-mentioned conditions when a mouse driver is enabled; a step for forming a mouse data frame if an input operation of the cursor key is carried out in the case where the mouse hot key is enabled; a step for detecting whether the mouse is disabled in the case where a present operation mode is a stream mode after the detection is carried out whether the present operation mode is the stream mode; a step for transmitting the mouse data frame to a central processing unit (CPU) in the case where the mouse is not disabled; and a step for returning.

5 Claims, 4 Drawing Sheets

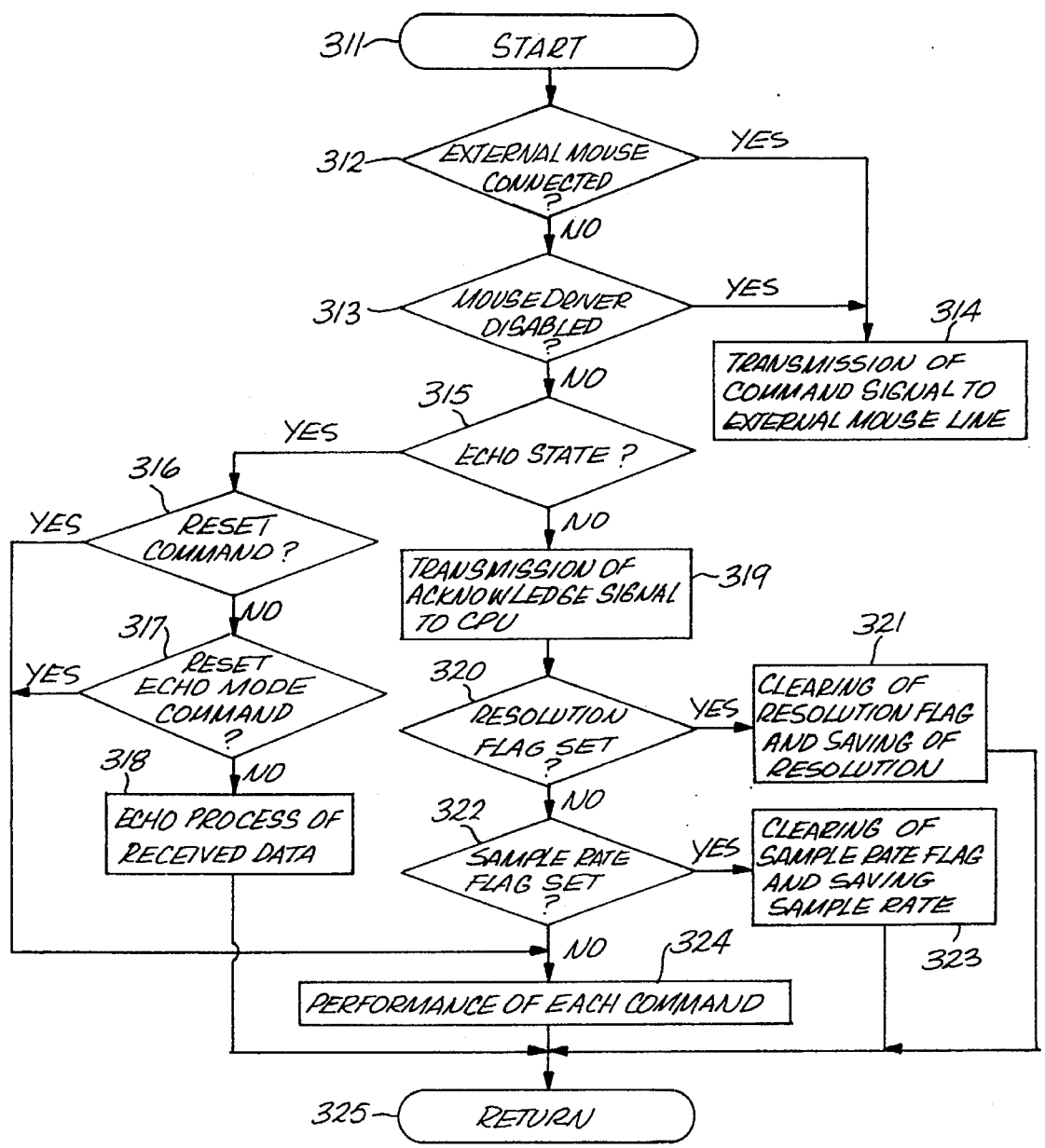

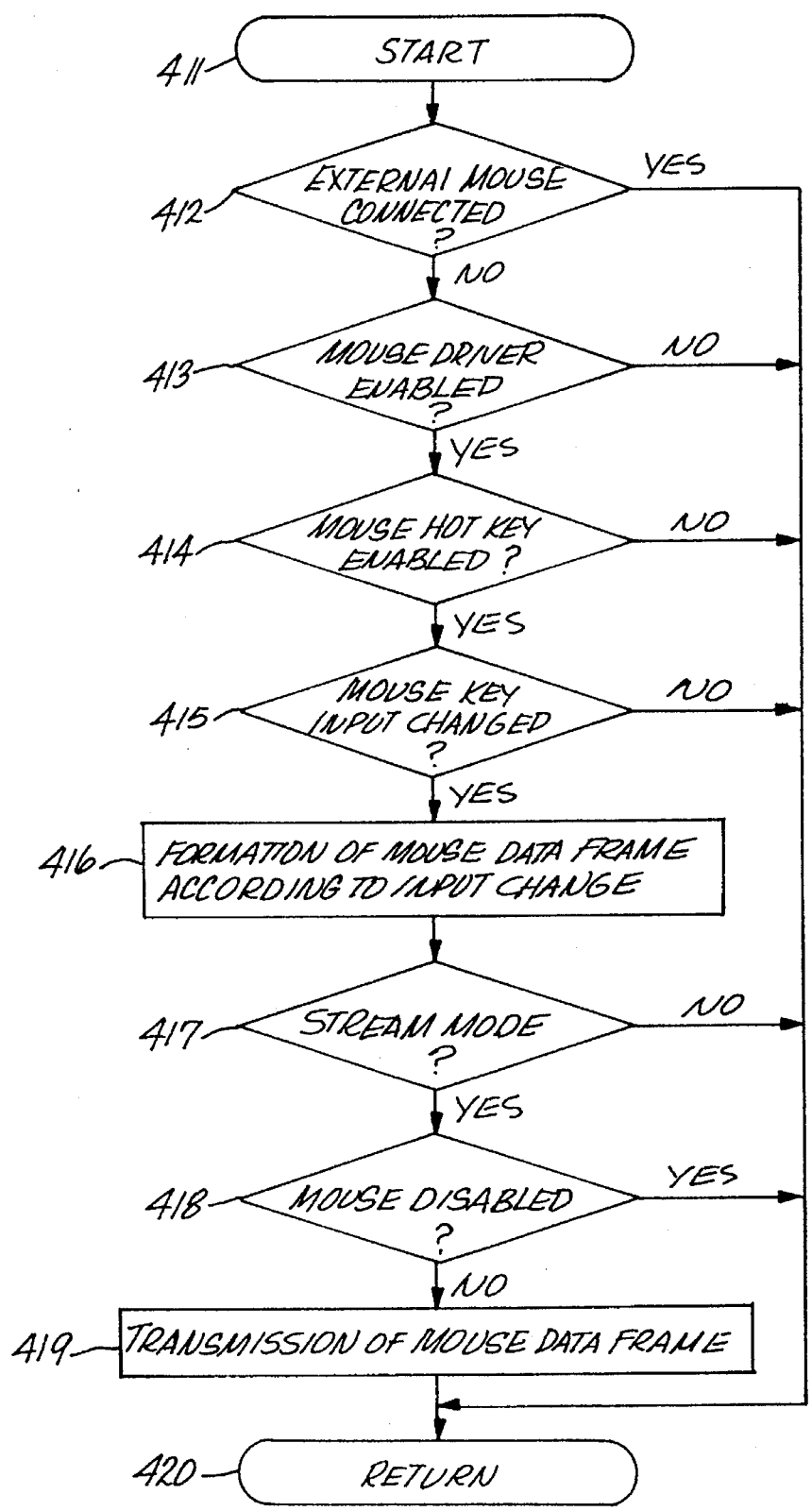

METHOD FOR PROVIDING MOUSE FUNCTIONALITY USING EITHER AN INTERNAL OR EXTERNAL MOUSE INPUT DEVICE

CROSS-REFERENCE TO RELATED APPLICATION

This is a continuation application of Ser. No. 07/991,096, filed Dec. 15, 1992 now abandoned.

FIELD OF THE INVENTION

This invention relates to a method for emulating a mouse function using a keyboard, and more particularly to a method for emulating the mouse function using a keyboard by moving a pointer on a screen to an X axis (horizontal axis) and a Y axis (vertical axis) freely using a cursor key of the keyboard instead of a mouse, switching an operation mode of the keyboard.

DESCRIPTION OF THE PRIOR ART

A mouse, as one of peripheral devices, is a pointer position input device capable of moving a pointer on a screen to an X axis and a Y axis freely. Types of mouse input devices include mechanical, optical, key and the like.

With a mechanical mouse, a ball installed in a main body of the mouse, is rotatable by moving the mouse on a table. The ball is designed to roll relative to the X axis and the Y axis. The pointer moves according to rotation frequencies of X axis and Y axis direction detection rings that rotate.

In the case of an optical mouse, a line detection device formed by a light-emitting element and a light-receiving element, detects a position of the mouse in a perpendicular and horizontal rectangular having different colours on a mouse pad - - - (e.g., a rectangular formed by a green line pattern of the X axis direction) and a red line pattern of the Y axis direction - - - and instructs the pointer of movements of the X axis and the Y axis. Based on these instructions, the pointer moves relative to the X axis and the Y axis.

A key mouse is united with a keyboard. The key mouse is the shape of a key used in the keyboard. If the key mouse portion of the keyboard is pressed, the mouse function is performed by producing an alteration in frequency or voltage according to a pressed portion of the key mouse.

With the recent trend toward lighter weight, more portable computers, the mouse input devices that must be carried independent of the computer (e.g., mechanical mouse or optical mouse) are inconvenient. In addition, the mechanical mouse needs a plate on which the ball can roll smoothly, and the optical mouse also needs the plate which reflects light emitted from the light-emitting element.

The key mouse is undesirable since other common mouses cannot be used. Further, a special keyboard has to be made with the mouse mounted in the keyboard.

To overcome the above disadvantages, a study has been made of the keyboard having a built-in mouse that can replace the mouse function by moving the pointer using the cursor key of the keyboard.

Japanese Patent Application Publication No. Hei 4-625 (Publication Date: Jan. 6, 1992) (hereinafter referred to as "data processing device") discloses a processing method of a keyboard having the mouse function.

The "data processing device" enables the pointer to be moved by the cursor key. A conversion key mounted on the keyboard converts the cursor key from a cursor key movement mode to a pointer movement mode.

The processing method of the keyboard having the mouse function disclosed in the "data processing device" will be explained hereinafter with reference to an accompanying drawing.

FIG. 1 shows an operation sequence of a processing method of a keyboard having a conventional mouse function. As shown in FIG. 1, the processing method comprises:

a step 11 at which a cursor key control mode begins;

a step 12 for determining whether the cursor key is pressed;

a step 13 for processing of the cursor movements in a case where it is determined that the cursor key is pressed in step 12;

a step 14 for determining whether a mode conversion key is pressed in the case where it is determined that the cursor key is not pressed in step 12;

a step 15 for determining whether the cursor key is pressed in the case where it is determined that the mode conversion key is pressed in step 14;

a step 16 for processing the pointer movement in the case where the cursor key is pressed in step 15; and a step 17 for determining whether the mode conversion key is opened in the case where it is determined that the cursor key is not pressed in step 15.

According to the conventional keyboard having the mouse function as described above, the cursor key can substitute for the mouse function by converting the cursor key from a mode for moving the cursor key to a mode for moving the pointer, since the mode conversion key is available when the cursor key is not pressed.

However, the data processing device disclosed only the simple idea about the method for moving and processing the pointer by using the cursor key, and does not disclose a detailed embodiment for carrying out the invention. Therefore, that method has a problem that it cannot be easily embodied by a person ordinarily skilled in the art to which the invention concerned relates.

SUMMARY OF THE INVENTION

The object of the present invention is to provide a detailed method for emulating the mouse function using the keyboard by switching an operation mode of the keyboard and using a cursor key on the keyboard instead of a mouse, for moving a pointer on a screen to an X axis (horizontal axis) and a Y axis (vertical axis) freely. The object of the present invention further provides an emulation method for a mouse command and methods of generation and transmission of data.

The object described above can be achieved by an emulation method as follows:

a keyboard controller determines whether an mouse driver (MOUSE.COM or MOUSE.SYS) is disabled when a command for mouse is input in a case where it has been determined that an external mouse is not connected to the computer system;

the keyboard controller transmits command signals to the external mouse line in the case where the external mouse is connected to the computer system, or the mouse driver is disabled;

the keyboard controller detects whether the received data is a reset command in the case where a built-in mouse is in an echo state where it has been determined that the mouse driver is not disabled and a built-in mouse is in an echo state;

the keyboard controller echoes the received data when the received data is not a reset echo mode command and not the reset command, and returns;

the keyboard controller transmits acknowledgement signals to a central processing unit (CPU) in the case where the mouse is not in an echo state, the keyboard controller saves a resolution, clears a resolution flag in the case where the resolution flag is set, and returns, when the keyboard controller determines that the resolution flag is set;

the keyboard controller detects whether a sample rate flag is set in the case where the resolution flag is not set;

the keyboard controller saves the sample rate flag, clears the sample rate flag and returns where the sample rate flag is set; and the keyboard controller carries out each command and returns where the sample rate flag is not set and where the command is determined to be a reset command or a reset echo mode command.

The object described above can also be achieved by another emulation method as follows:

the keyboard controller detects whether the mouse driver is enabled in the case where it has been determined that an external mouse is not connected to the system, if the emulation for the mouse command is finished and the built-in mouse begins to be used;

the keyboard controller forms a mouse data frame if an input operation of the cursor key is carried out in the case where a mouse hot key is enabled, and the driver is enabled;

the keyboard controller determines whether the present operation mode is stream mode;

the keyboard controller transmits the mouse data frame to a central processing unit (CPU) after it has been determined that the mouse is not disabled and that the present operation mode is stream mode;

the keyboard controller returns in the case where the external mouse is connected to the system, the mouse driver is disabled, the mouse hot key is disabled, there is no change in the cursor key input, the present operation mode is not the stream mode, the mouse is disabled, or the mouse transmits the mouse data frame.

BRIEF DESCRIPTION OF THE DRAWINGS

FIG. 3 is a flow diagram showing an emulation method for a mouse command according to the embodiment of the present invention.

FIG. 4 is a flow diagram showing generation and transmission methods of a mouse data according to the embodiment of the present invention.

DESCRIPTION OF THE PREFERRED EMBODIMENTS

The preferred embodiments of the present invention as described above are explained in detail with reference to the accompanying drawings.

Figure 1:
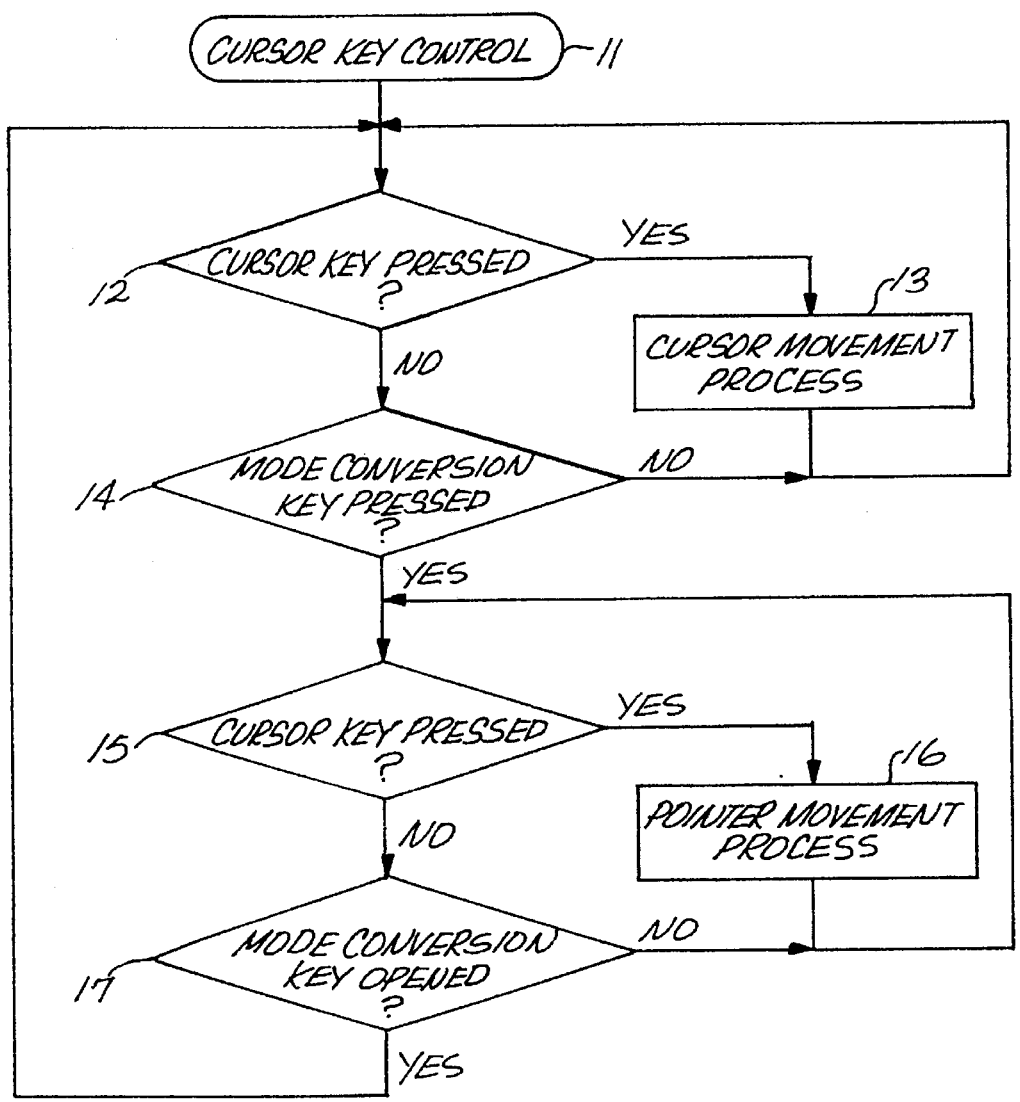
FIG. 1 is a flow diagram showing a processing method of a keyboard having a prior art mouse function.
Figure 2:
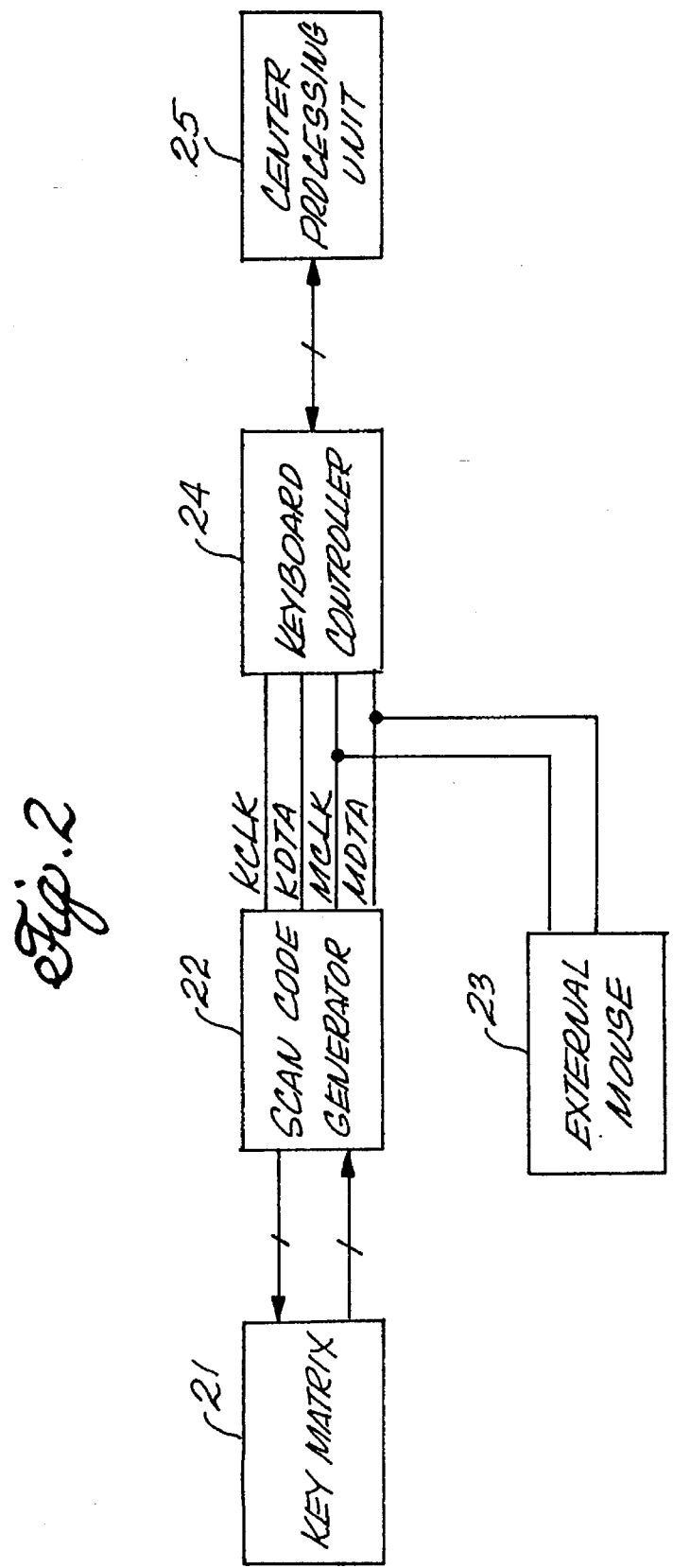
FIG. 2 is a circuit diagram showing a keyboard having a mouse function according to an embodiment of the present invention.

FIG. 2 is a circuit diagram showing a keyboard having a mouse function according to an embodiment of the present invention. As shown in FIG. 2, the keyboard having a mouse function according to an embodiment of the present invention comprises a key matrix 21, a scan code generator 22 connected to the system to a key matrix 21, an external mouse 23 optionally connected by a user, a keyboard controller 24 connected to scan code generator 22 and an external mouse, and a central processing unit (CPU) 25 connected to keyboard controller 24.

In the embodiment of the present invention, a 80C51SL-BG chip made by Intel Corp. is used as scan code generator 22 and keyboard controller 24. However, the technical field of the present invention is not limited to this.

FIG. 3 is a flow diagram showing an emulation method for a mouse command according to the embodiment of the present invention. FIG. 4 is a flow diagram showing generation and transmission methods of mouse data according to the embodiment of the present invention. These figures illustrate the embodiment of the keyboard having a mouse function.

As shown in FIG. 3, an emulation method for a mouse command according to the embodiment of the present invention comprises:

a step 311 for a start;

a step 312 for detecting whether an external mouse is connected to the system;

a step 313 for detecting whether an mouse driver is disabled in a case where the external mouse is not connected to the system;

a step 314 for transmitting command signals to an external mouse line in the case where the external mouse is connected to the system or the mouse driver is disabled;

a step 315 for detecting whether a built-in mouse is in a state of echo in the case where the mouse driver is not disabled;

a step 316 for determining whether the received data is a reset command in the case where the built-in mouse is in the state of echo;

a step 317 for determining whether the received data is the reset echo mode in the case where the received data is not the reset command;

a step 318 for echoing the received data in the case where the received data is not a reset echo mode;

a step 319 for transmitting acknowledge signals to a host in the case where the built-in mouse is not in a state of echo;

a step 320 for determining whether a resolution flag is set;

a step 321 for saving a resolution and clearing the resolution flag in the case where the resolution flag is set;

a step 322 for determining whether a sample rate flag is set in the case where the resolution flag is not set;

a step 323 for saving the sample rate flag and clearing the sample rate flag in the case where the sample rate flag is set;

a step 324 for carrying out each command in the case where the received data is the reset command or the reset echo mode command, or in the case where the sample rate flag is not set; and a step 325 for returning after carrying.

As shown in FIG. 4, the generation and the transmission methods of the mouse data according to the embodiment of the present invention comprise:

a step 411 for a start;

a step 412 for detecting whether an external mouse is connected to the system;

a step 413 for detecting whether an mouse driver is enabled, in the case where an external mouse is not connected to the system;

a step 414 for detecting whether a mouse hot key is enabled in the case where an mouse driver is enabled;

a step 415 for detecting whether a change in the mouse key input exists in the case where the mouse hot key is enabled;

a step 416 for forming the mouse data frame if the cursor key input exists;

a step 417 for determining whether a present operation mode is stream mode;

a step 418 for detecting whether the mouse is disabled in the case where the present operation mode is stream mode;

a step 419 for transmitting a mouse data frame to a central processing unit (CPU) in the case where the mouse is not disabled;

a step 420 for returning in the case where the external mouse is connected, or the mouse driver is disabled, or the mouse hot key is disabled, or the change of the cursor key does not exist, or the present operation mode is not the stream mode, or the mouse is disabled, or a mouse data frame is transmitted by the mouse.

The operations, using a keyboard emulating a mouse (hereinafter described as "a built-in mouse") according to the embodiment of the present invention as described above, are as follows.

If the user executes a mouse driver program (MOUSE.SYS or MOUSE.COM) to use the built-in mouse, a command for the mouse is transmitted from the CPU 25 to the keyboard controller 24.

The keyboard controller 24 emulates the mouse command first if the keyboard controller receives a command for the mouse from the CPU 25.

The keyboard controller 24 causes mouse data signals (MCLK, MDATA) to be directly inputted from the external mouse 23 to the keyboard controller 24 by transmitting command signals to the external mouse 23 in the case where a determination has been made that the external mouse 23 is connected to the system.

The keyboard controller 24 transmits an occurrence of a timeout error to the CPU 25, standing by to transmit the command signal to the external mouse line within a predetermined time, if it has been determined from CMOS setup data that the mouse driver is not enabled, in the case where the external mouse 23 is not connected. Accordingly, it is possible to determine that the mouse driver is not enabled in the CPU 25. The keyboard controller 24 causes the mouse data signals (MCLK, MDATA) generated by the built-in mouse to be inputted to the keyboard controller 24 by transmitting the command signals to a scan code generator 22, in the case where the mouse driver is enabled.

The scan code generator 22 determines whether the built-in mouse is in the echo state, if the command signal is inputted from the keyboard controller 24, in the case where the mouse driver is enabled. The above-mentioned echo state is the mode which echoes the data transmitted from the CPU 25 through the keyboard controller 24. In the case where the built-in mouse is in the echo state, the scan code generator 22 reads the data transmitted from the keyboard controller 24, and carries out the echo process for all commands, except the reset command or the reset echo mode command.

The scan code generator 22 transmits the acknowledgement signal to the CPU 25 through the keyboard controller 24, in the case where the built-in mouse is not in the echo state.

Next, after detecting whether a resolution flag is set indicating a need to set a new resolution value, the scan code generator 22 converts the resolution into a variable, saves it, and clears the resolution flag when the resolution flag is set.

If the resolution flag is not set, the scan code generator 22 detects whether a sample rate flag is set. If the sample flag is set, indicating a need to set a new sample rate, the scan code generator 22 converts the sample rate into a variable, saves it, and clears the sample rate flag.

Finally, the scan code generator 22 terminates an emulation routine by carrying out the corresponding process to each command of the data transmitted from the CPU 25 through the keyboard controller 24.

If the emulation for the mouse command is finished, the scan code generator 22 forms the mouse data from the data inputted from key matrix 21, and transmits it to keyboard controller 24.

In this case, first, the scan code generator 22 detects whether the external mouse 23 is connected to the system, and then detects whether the mouse driver is enabled from the CMOS setup data. Lastly, the scan code generator 22 detects whether the mouse hot key is enabled from the signal inputted from the key matrix 21. If the external mouse 23 is connected to the system, or the mouse driver is disabled to the CMOS set up data, or the mouse hot key is disabled from the data inputted from the key matrix 21, the scan code generator 22 stops using the built-in mouse.

The mouse hot key is a key for converting the mode of the keyboard. If the user presses the hot key, the mode of the keyboard is converted from key input mode to mouse input mode, or from mouse input mode to key input mode.

But, if the external mouse 23 is not connected to the system, and mouse driver is enabled, and the mouse hot key is enabled, scan code generator 22 generates the mouse data frame according to the resolution, and transmits the mouse data frame to the keyboard controller 24.

The mouse data frame made by the scan code generator 22 and transmitted to the keyboard controller 24 in series through the mouse data signal lines (MCLK, MDATA), consists of 3 bytes. A report format of the mouse data frame is as follows.

1. The first byte
    bit 0 : left button state         (1 = pressed)
    bit 1 : right button state        (1 = pressed)
    bit 2 : central button state      (1 = pressed)
    bit 3 : reserved                  (default 1)
    bit 4 : X data sign               (1 = a negative sign)
    bit 5 : Y data sign               (1 = a negative sign)
    bit 6 : X data overflow           (1 = overflow)
    bit 7 : Y data overflow           (1 = overflow)
2. The second byte
    bit 0 - - - bit 7 : X data
3. The third byte
    bit 0 __ bit 7 : Y data The scan code generator 22 forms the mouse data frame, and then reads whether the present operation mode is stream mode.

The scan code generator 22 transmits the mouse movement and button data contained in the 3 byte mouse data frame to the keyboard controller 24 in the case where the present operation mode is stream mode.

The keyboard controller 24 transmits the 3 byte mouse data inputted as described above to the CPU 25 through an interrupt.

The mouse driver program moves the pointer on the screen according to the mouse data if the 3 byte data frame transmitted from the keyboard controller 24 to the CPU 25, so that the pointer moves on the screen according to the data inputted from the key matrix 21.

As shown above, the embodiment of the present invention provides a method for emulating a mouse function using a keyboard and, more particularly, a method for emulating the mouse function using the keyboard by moving a pointer on a screen to an X axis (horizontal axis) and a Y axis (vertical axis) freely, with switching an operation mode of the keyboard and using a cursor key of the keyboard instead of the mouse. This effect of the present invention can be applied to the fields of the mouse and the keyboard.

What is claimed is:

1. A method for providing mouse emulation in a computer system having a CPU and a mouse driver, said system capable of using an external mouse and a keyboard emulating a mouse based on inputs from keyboard keys, said keyboard having a controller, comprising the steps of:

detecting whether said external mouse is connected to said commuter system upon a command for mouse input;

detecting whether said mouse driver is enabled or disabled;

transmitting command signals to said external mouse when said external mouse is connected to the system or said mouse driver is disabled;

detecting whether said mouse driver is in an echo state echoing through the keyboard controller all data transmitted from the CPU;

detecting whether received data is a reset control command when said mouse driver is in said echo state;

performing said reset control command when said received data is said reset control command and said mouse driver is in said echo state;

echoing said received data when said mouse driver is in said echo state and said received data is not said reset control command;

transmitting an acknowledgement signal to a central processing unit (CPU) when said mouse driver is not in said echo state;

determining, by the keyboard controller, whether a control flag is set when said mouse driver is not in said echo state;

performing an operation indicated by said control flag when said control flag is set; and performing a mouse command, emulating the functionally of said external mouse, when said mouse driver is not in said echo state and said control flag is not set.

2. The method of claim 1 wherein said reset control command is a reset command.

3. The method of claim 1 wherein said reset control command is a reset echo mode command.

4. The method of claim 1 wherein said control flag is a resolution flag indicating a need to save a new resolution value, further comprising the steps of:

determining, by said keyboard controller, whether said resolution flag is set; and saving said new resolution value and clearing said resolution flag when said resolution flag is set.

5. The method of claim 1 wherein said control flag is a sample rate flag further comprising the steps of:

determining, by said keyboard controller, whether said sample rate flag is set, said sample rate flag indicating a need to save a new sample rate; and saving said new sample rate and clearing said sample rate flag when said sample rate flag is set.

* * * * *

UNITED STATES PATENT AND TRADEMARK OFFICE
CERTIFICATE OF CORRECTION

PATENT NO. : 5,608,895
DATED : March 4, 1997
INVENTOR(S) : Kwanho Lee

It is certified that error appears in the above-indentified patent and that said Letters Patent is hereby corrected as shown below:

On the title page, Item 54, the title should read -- METHOD FOR PROVIDING MOUSE FUNCTIONALITY USING EITHER THE KEYBOARD OR AN EXTERNAL MOUSE INPUT DEVICE --.

Column 1, lines 3,4, the title should read -- METHOD FOR PROVIDING MOUSE FUNCTIONALITY USING EITHER THE KEYBOARD OR AN EXTERNAL MOUSE INPUT DEVICE --.

Column 2, line 58, change "an mouse" to -- a mouse --.
Column 3, line 35, before "driver" insert -- mouse --.
Column 4, line 28, change "an mouse" to -- a mouse --.
Column 4, line 61, after "returning" delete "after carrying".
Column 5, lines 1,5, change "an mouse" to -- a mouse --.
Column 7, line 2, change "data if" to -- data in --.
Column 7, line 22, change "commuter" to -- computer --.
Column 8, line 13, replace "functionally" with -- functionality --.

Signed and Sealed this

Sixth Day of January, 1998

Attest:

Attesting Officer

BRUCE LEHMAN

Commissioner of Patents and Trademarks